United States Patent [19]

Weiss

[11] Patent Number: 4,846,761

[45] Date of Patent: Jul. 11, 1989

[54] FLEXIBLE ALL-STEEL SHAFT COUPLING

[75] Inventor: Rudolf Weiss, Vreden, Fed. Rep. of Germany

[73] Assignee: Atec-Weiss KG, Vreden, Fed. Rep. of Germany

[21] Appl. No.: 128,553

[22] Filed: Dec. 4, 1987

[30] Foreign Application Priority Data

Dec. 5, 1986 [DE] Fed. Rep. of Germany ....... 3641547

[51] Int. Cl.$^4$ ............................................. F16D 3/56
[52] U.S. Cl. ........................................ 464/69; 464/8
[58] Field of Search ................... 464/7, 8, 69, 98, 99, 464/903

[56] References Cited

U.S. PATENT DOCUMENTS

| 1,387,532 | 8/1921 | Dexter | 464/99 |
| 4,019,345 | 4/1977 | Fukuda | 464/69 |
| 4,019,346 | 4/1977 | Fukuda | 464/69 X |
| 4,708,692 | 11/1987 | Weiss | 464/69 |

Primary Examiner—Daniel P. Stodola
Attorney, Agent, or Firm—Sprung Horn Kramer & Woods

[57] ABSTRACT

A flexible all-steel shaft coupling with two connecting flanges which are connected by a laminated spring ring arranged between them. The laminated spring ring is arranged on clamping bolts by clamping bushes and is held at a distance from the flanges by spacer collars. A washer with a low-friction coating is arranged between the laminated spring ring and each of the spacer collars. The washers prevent the upper lamellae from wrapping as a result of the rotation of the spacer collars during the bracing of the laminated spring ring, this being the cause of premature breaking of the lamellae.

5 Claims, 1 Drawing Sheet

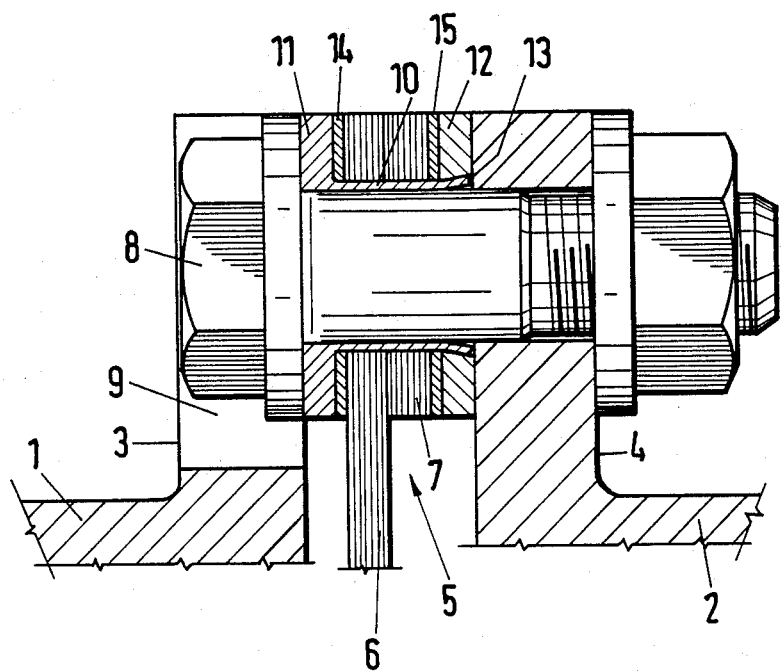

FLEXIBLE ALL-STEEL SHAFT COUPLING

BACKGROUND OF THE INVENTION

The invention relates to a flexible all-steel coupling with a connecting flange for each of the two coupling halves and with a resilient laminated ring which is arranged between and at an axial distance from the two connecting flanges and is connected alternately to one connecting flange or the other in the peripheral direction by means of clamping bolts, and which rests on bushes, especially clamping bushes of the clamping bolts and is braced together with the connecting flanges between spacer collars.

In a known all-steel shaft coupling, the laminated ring consists of individual plates which themselves each consist of a plurality of thin individual lamellae lying on top of one another and combined into a stack. The clamping bolts each brace two plates arranged above one another at their ends. So that the individual lamellae do not shift during operation, for example under impact load, it is necessary to brace the stacks with a high clamping force. Furthermore, the plates can be secured by providing clamping bushes which compensate for radial tolerances in the bores of the stacks (German Offenlegungsschrift No. 3,443,485).

When such shaft couplings are used, it has been shown that, despite the high clamping force with which the stacks of lamellae are braced, the particular outer lamellae are especially in danger of breaking in the region of the clamping bolts. The object on which the invention is based is, therefore, to provide flexible all-steel shaft coupling of the type mentioned in the introduction, in which the outer lamellae of the laminated ring are in less danger of breaking than in the known coupling.

SUMMARY OF THE INVENTION

According to the invention, this object is achieved in that between each of the spacer collars and the laminated ring there is a washer which has a low-friction surface on the side facing the stack of lamellae. Preferably, each washer has a low-friction surface on both sides. The low-friction surface can be obtained by greasing the washer with a lubricant coating, for example with a pressure lubricant. A suitable pressure lubricant is, for example, Molykote which generally is composed of molybdenum disulfide.

In the search for the cause of premature breaking of the upper lamellae, it was found that, when the high bracing force is generated, the upper lamellae warp easily as a result of the slight rotation of the bush or of the spacer collars. The use of washers with the low-friction surface or low-friction surfaces prevents a torque from being transmitted as a result of friction to the upper lamellae from the bush or the spacer collars during the bracing of the screw bolts. The upper lamellae can consequently no longer experience warping.

BRIEF DESCRIPTION OF THE DRAWINGS

The invention is explained in detail below with reference to the FIGURE which illustrates an exemplary embodiment and which shows a section from the shaft coupling in axial cross-section.

DETAILED DESCRIPTION OF THE INVENTION

Two shafts 1, 2 carry flanges 3, 4 which face one another and between which is arranged a laminated spring ring 5 connecting them.

The laminated spring ring 5 consists of individual plates 6, 7 which are laid on top of one another at their ends and which form a ring. Each plate 6, 7 is composed of a plurality of thin flat lamellae made of spring steel. Instead of such a laminated ring, a laminated ring consisting of annular lamellae can also be provided.

As seen in the peripheral direction, the ring 5 is braced alternately together with one flange 3, 4 or the other by means of a screw bolt 8. In the drawing, the ring 5 is braced together with the right-hand flange 4, while the other flange 3 has a recess 9 for each screw bolt 8 on the opposite side. The ring 5 rests on a bush 10 which has a collar 11 at one end. Located on the bush 10, on the side opposite the collar 11, is a collar 12 which is held by means of the flared edge 13 of the bush 10. The plates 6, 7 form together with the bush 10, the collar 11 and the collar 12, a preassembled constructional unit.

The all-steel laminated coupling described thus far belongs to the state of the art (German Offenlegungsschrift No. 3,443,485). In such a coupling, according to the teaching of the invention there is on both sides of the laminated ring 5, between this and both the collar 11 and the collar 12, a washer 14, 15 which carries at least on one side, but preferably on both sides, a friction-reducing coating, for example a pressure lubricant, such as Molykote, which has a coefficient of friction of less than 0.1, preferably between 0.05 and 0.08. The use of such washers 14, 15 prevents the upper lamellae from experiencing warping when the laminated ring 5 is braced by means of the screw bolt 4. Because such warping is avoided, the danger of premature breaking of the upper lamellae is reduced.

I claim:

1. In a flexible all-steel shaft coupling including two coupling members each having a connecting flange with connecting bores, a resilient laminated ring disposed between the two flanges and having apertures therethrough, a clamping bush disposed in each aperture and having spacing collars disposed between the ring and each flange to axially space the ring from the flanges, and a connecting bolt disposed through the connecting bores and each clamping bush, the improvement comprising a washer disposed between each of the spacing collars and the ring and wherein at least one side of each washer has a low-friction surface.

2. The shaft coupling according to claim 1, wherein each washer has a low-friction surface on both sides.

3. The shaft coupling according to claim 1 or 2, wherein the low-friction surface comprises a pressure-lubricant coating.

4. The shaft coupling according to claim 1 wherein the low-friction surface has a coefficient of friction of less than 0.1.

5. The shaft coupling according to claim 1, wherein the low-friction surface has a coefficient of friction between 0.05 and 0.08.

* * * * *